United States Patent [19]
Terui

[11] Patent Number: 5,336,863
[45] Date of Patent: Aug. 9, 1994

[54] METHOD OF, AND AN APPARATUS FOR, ELECTRICAL-DISCHARGE MACHINING

[75] Inventor: Koji Terui, Tamayama, Japan

[73] Assignee: Sodick Co., Ltd., Yokohama, Japan

[21] Appl. No.: 960,395

[22] PCT Filed: May 8, 1992

[86] PCT No.: PCT/JP92/00590

§ 371 Date: Jan. 7, 1993

§ 102(e) Date: Jan. 7, 1993

[87] PCT Pub. No.: WO92/19661

PCT Pub. Date: Dec. 11, 1992

[30] Foreign Application Priority Data

May 10, 1991 [JP] Japan ................ 3-135529

[51] Int. Cl.$^5$ ............................................. B23H 1/10
[52] U.S. Cl. ................................ 219/69.14; 219/69.17
[58] Field of Search ............... 219/69.13, 69.14, 69.17

[56] References Cited

U.S. PATENT DOCUMENTS

| | | | |
|---|---|---|---|
| 4,071,729 | 1/1978 | Bell, Jr. ................... | 219/69.13 |
| 4,134,807 | 1/1979 | Briffod ................... | 219/69.17 |
| 4,628,170 | 12/1986 | Furukawa ................ | 219/69.14 |
| 5,091,620 | 2/1992 | Mohri et al. .............. | 219/69.13 |

FOREIGN PATENT DOCUMENTS

| | | | |
|---|---|---|---|
| 61-30334 | 2/1986 | Japan ................. | 219/69.13 |
| 62-74527 | 4/1987 | Japan ................. | 219/69.17 |
| 3-136725 | 6/1991 | Japan ................. | 219/69.17 |

Primary Examiner—Geoffrey S. Evans
Attorney, Agent, or Firm—Marks & Murase

[57] ABSTRACT

A method for electrical-discharge machining ("EDM") of a workpiece (W) in the work tank (T) using water and oil based working fluids, the method involving die-sink EDMing using a water based working fluid, and then discharging the water based working fluid from a machined portion formed between a tool electrode (EL) and the workpiece (W) and replacing it with an oil-based working fluid. The process involves removing the water based working fluid remaining in the machined portion through electrical-discharge machining after the initial replacing process, and then carrying out electrical-discharge machining using an oil-based working fluid under the required working conditions after the water-removing process.

When electrical-discharge machining is carried out by changing from a water based working fluid to an oil based working fluid according to the invention, the water based working fluid remaining in the machined portion is completely and easily removed without the need for handwork.

20 Claims, 14 Drawing Sheets

| VOLUME OF MACHINED PORTION (cm³) | WATER-REMOVING TIME (SECONDS) | |
|---|---|---|
| | FOR 60A | FOR 30A |
| 10³ | 33 | 65 |
| 20³ | 133 | 267 |
| 30³ | 305 | 612 |
| 40³ | 576 | — |

FIG. 5

| VOLUME OF MACHINED PORTION (cm³) | RESIDUAL AMOUNT OF WATER (cc) | WATER-REMOVING TIME (SEC) | | MEAN WORKING VOLTAGE RECOVERY TIME (SEC) | | QUANTITY OF HEAT CONSUMED (KCAL) |
|---|---|---|---|---|---|---|
| | | FOR 60A | FOR 30A | FOR 60A | FOR 30A | |
| 10³ | 188 | 33 | 65 | 30 | 60 | 15 |
| 20³ | 770 | 133 | 267 | 120 | 260 | 60 |
| 30³ | 1761 | 305 | 612 | 300 | 610 | 141 |
| 40³ | 3149 | 576 | — | 500 | — | 265 |

FIG. 6

METHOD OF, AND AN APPARATUS FOR, ELECTRICAL-DISCHARGE MACHINING

FIELD OF THE INVENTION

The present invention relates to a die sinking type electrical-discharge machining ("EDM") method and apparatus which uses both water and oil based working fluids having a resistivity of more than 1000Ω/cm.

BACKGROUND OF THE INVENTION

In die-sinking type electrical-discharge machines which use both water and oil based working fluids, a common machining sequence is for roughing to be carried out using the water based working fluid, and finishing to be carried out using the oil based working fluid. This sequence is used because the water based working fluid results in a relatively rough machined surface but with improved machining speed, while the oil based working fluid results in relatively fine machined surface but with a decrease in working speed.

FIG. 11 is a schematic representation of an apparatus for carrying out electrical-discharge machining based on the condition of a workpiece W1, and proceeds according to the sequence of FIG. 11 (A), (B), (C), (D).

In the following description, the water and oil based working fluids are simply referred to as "water" and "oil" respectively. Also in the drawings, water and oil based working fluids are noted simply as "water" and "oil", respectively.

In the above background art, the workpiece W1 is disposed in a work tank T in which an electrode EL1 is designed to move generally vertically. Water 10 is supplied from a service tank 30a for accumulating water, to a machined recess A formed in the workpiece W1, through a check valve 35 and electrode EL1 by means of a pump 31. The water 10 is further supplied from the tank 30a through a check valve 37 by means of a pump 33, and fills the work tank T. In addition, oil 11 is supplied from a service tank 30b, for accumulating oil, to the machined recess A through a check valve 36 and electrode EL1 by means of a pump 32. The oil 11 is further supplied from the tank 30b through a check valve by means of a pump 34, to fill the work tank T.

The water 10 which has accumulated in the work tank T is returned to the tank 30a through a drain 14 and a tank 20a for recovered water. In addition, the oil which has accumulated in the work tank T is fed into the tank 30b through the drain 14 and a tank 20b for recovered oil. The apparatus is constructed so that the working fluids in the tanks 30a and 30b are fed into a separating device 23 through a filter 21, to filter out water, and a filter 22, to filter out oil, respectively. The separated water and oil is then returned to the tanks 30a and 30b, respectively.

In this background art, the workpiece W1 is disposed in the work tank T, and as shown in FIG. 11(A), when the pumps 31 and 33 are actuated to supply the water 10 into the work tank T from the tank 30a, the pumps 32 and 34 remain stopped.

Then, roughing is carried out by applying machining voltage pulses between the workpiece 1, immersed in water, and the electrode EL1 according to appropriate working conditions. When the roughing cut has been finished, as shown in FIG. 11(B), the pumps 31 and 33 are stopped and the water 10 is discharged into the tank 20a from the work tank T through the drain 14. The condition wherein the electrode EL1 has machined into the machined recess A in the workpiece W1 is retained at this time.

Thereafter, as shown in FIG. 11(C), a pump 38 is actuated to supply the oil 11 into the work tank T while the electrode EL1 is still in position to machine into the machined recess A. Likewise a pump 36 is actuated to supply the oil 11 to the machined part A through the electrode EL1.

The water 10 may remain in the machined recess A in the workpiece W1, even after the water 11 is drained and, therefore, a system such that by continuously supplying the oil 11 into the machined recess A by means of the pump 36, any water 10 remaining in the recess will be forced out of the machined recess A by the resulting injection pressure employed to supply the oil. The exchange of the water 10 and the oil 11 is thus completed.

After removing the water 10 from the machined recess A, the electrode ELI is caused to go up once as shown in FIG. 11(D), then the pumps 36 and 38 are actuated to supply the oil 11 into the work tank T from the tank 30b and then finishing is carried out on the workpiece W1 immersed in oil.

FIG. 12 is a working schematic representation of other background art.

In this background art, an example of a workpiece W2 which has already been machined with respect to part of its recess to be machined, then, electrical-discharge machining is carried out with the electrode EL1 as shown, and acts in the sequence of FIG. 12 (A), (B), (C), (D).

In this background art, a solenoid valve 40 and a pump 41 are provided, and are arranged such that the water 10 is suctioned through the electrode EL1 into the tank 20a.

First, as shown in FIG. 12(A), when roughing is carried out on the workpiece W2, a solenoid valve 39 is opened, and pumps 31 and 33 are actuated to supply the water 10 into the work tank T from the tank 30a. At this time, the pumps 32 and 34 are stopped, the solenoid valve 40 is closed and the pump 41 is stopped.

Then, after the roughing cut with the electrode EL1 has been finished, the drain 14 is opened, and the solenoid valve 39 is closed and the pumps 31 and 33 stopped with the electrode EL still in position to machine into a machined recess A1 which was newly produced by the roughing cut as shown in FIG. 12(B). The solenoid valve 40 is opened and the pump 41 actuated. Thus, the water 10 remaining in the machined recess A1 is suctioned from the end of the electrode EL1, and the suctioned water 10 is fed to the tank 20a.

After the water 10 in the work tank T is discharged through the drain 14 as shown in FIG. 12(C) the pump 32 is actuated to supply the oil 11 into the work tank T from the tank 30b. Also the water 10 remaining in the machined recess A1 in the workpiece W2 is suctioned therefrom by actuating the pump 41 at this time.

Then, after the water 10 in the machined recess A is suctioned out, as shown in FIG. 12(D), the oil 11 is supplied to the electrode EL1 by closing the solenoid valve 40, opening the solenoid valve 39 and then actuating the pump 32. Then finish cutting is carried out by using the oil 11 as a working fluid.

In the above background art, the machining fluid supply is arranged such that after performing electrical-discharge machining using water, the water remaining is removed from the machined recess by scattering it using an oil jet or by suctioning it out of the recess.

However, such a method for removal of water has the disadvantage of being limited by the design of a jet nozzle provided in the electrode for jetting or suctioning the working fluid. For example, when a groove H formed in the machine recess A2 of a workpiece W3 is small, as shown in FIG. 13(A), it is difficult to provide the jet nozzle in the electrode part so as to oppose to the groove H. Furthermore, while in this case, it may be effective to suction water using the jet nozzle while vertically moving an electrode EL2 within the groove H, complete suctioning of the water is unlikely. Even assuming that the water removal method of the above background art is not restricted to a specific design for the jet nozzle, complete removal of the water is still not possible.

In addition to the above, there is the disadvantage that when machining is carried out by filling the work tank T with oil while water remains in the machined recess, machining will become unstable, and the consumption rate of the electrode will increase, generating unacceptable arc discharges during machining operations.

Of necessity, it can be arranged such that the water is completely removed manually from the machined recess. However, there is then a disadvantage in that automatic change over of the working fluid from water to oil is not possible. Further, in order to manually remove the water, an additional operation of removing the machined workpiece is required which requires additional time and labor. Furthermore, there is such a disadvantage that once the workpiece is removed from the worktable for separating the workpiece in the work tank T, repositioning of the electrode and the workpiece will be required.

SUMMARY OF THE PRESENT INVENTION

An object of the present invention is to provide a die-sinking electrical-discharge machining apparatus which uses either water or oil as a working fluid and which accomplishes automatic change-over of the working fluid from water to oil, and completely and easily removes any water remaining in the machined recess in the workpiece.

A further object of the invention is to provide a method for electrical-discharge machining using a die-sinking type electrical-discharge machine for machining a workpiece in a work tank T using either water or oil based working fluids. The method comprises a process of machining a workpiece using a water based working fluid, then discharging the water based working fluid from a machined portion formed between a tool electrode and the workpiece and replacing it with an oil based working fluid. The method includes removing any water based working fluid remaining in the machined portion through electrical-discharge machining after the replacing process, and carrying out electrical-discharge machining using an oil based working fluid under the required working conditions after the water removal process.

Preferably, the process of removing the water based working fluid is finished when a value of working voltage or current reaches or exceeds a required value, or may be finished when electrical-discharge machining has been performed for a required period of time, or both.

As described above, the present invention is arranged such that when electrical-discharge machining is carried out by changing from the water based working fluid to the oil based working fluid, the water based working fluid remaining in the machined portion, i.e., the machined recess, is almost completely and easily removed without the need for manual work.

BRIEF DESCRIPTION OF THE DRAWINGS

FIG. 5 is an illustration representing a correlation between the volume of the machined recess and the time required for removal of water.

FIG. 6 is an illustration representing measured data, being the basis for the correlative relationship shown in FIG. 5.

DETAILED DESCRIPTION OF THE INVENTION

Figure 1:
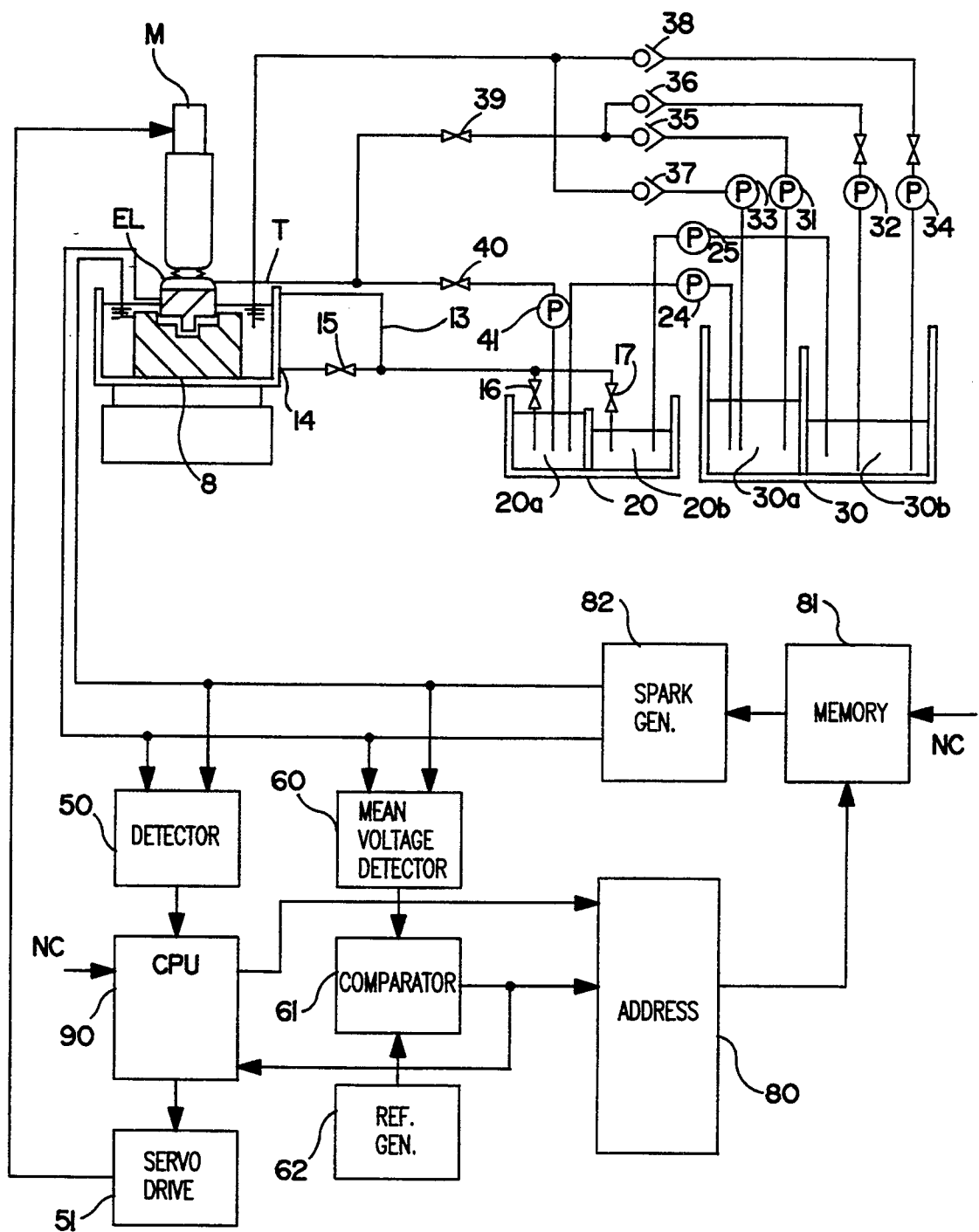
FIG. 1 is a schematic representation of one embodiment of the present invention.

FIG. 1 is a schematic representation of one embodiment of this invention. In the following description, water and oil based working fluids may be simply referred to as "water" and "oil" respectively In this embodiment, a solenoid valve 15 is attached to the drain 14 provided at the lower part of the work tank T. The working fluid is sent to a recovery and separation tank 20 through the solenoid valve 15. The tank 20 consists of tanks 20a, 20b divided with a partition, wherein water is recovered in the tank 20a through a solenoid valve 16, and oil in the tank 20b through a solenoid valve 17. The water in the tank 20a is further fed to the service tank 30a by actuating a pump 24, while the oil in the tank 20b is fed into the service tank 30b by actuating a pump 25.

Any overflow oil from the working fluids in the tank 20a flows into the tank 20b beyond the partition, any water at the bottom of the tank 20a being fed into the tank 30a by means of the pump 24. It follows that the tank 20 has a function of separating water and oil.

Water is supplied to a jet nozzle or orifice in the electrode EL1 from the service tank 30a for accumulating water through the check valve 35 and solenoid valve 39 by means of a pump 31. The apparatus is arranged so that the water is further supplied from the tank 30a through the check valve 37 to fill the work tank T. Also, oil is supplied to the machined recess A from the service tank 30b for accumulating oil through the check valve 36 and electrode EL1 by means of the pump 32. The apparatus is arranged so that the oil is further supplied from the tank 30b through the check valve 38 to fill the work tank T.

Furthermore, the apparatus is arranged so that the water may be suctioned through the electrode EL1 into the tank 20a, by means of the solenoid valve 40 and pump 41.

In addition, in order to maintain the working fluid level constant, one end of an overflow line 13 is attached to the upper part of the work tank T, and the other end is connected to the downstream of the solenoid valve 15.

A detector 50 is a circuit to detect the state of machining using discharged electric sparks which were generated in the gap between the electrode EL1 and the workpiece W1. The detector 50 is preferably a detector which samples machining voltages and converts the sensed values into binary signals (e.g., resolution: 1V). The detector 50 supplies the machining voltage to a CPU 90 as digital signals. The CPU 90 means an NC unit.

A servo drive 51 is a drive which actuates a servomotor M according to the signals for controlling the movement of the servo which are transmitted from the CPU 90, including half-fixed signals. A half-fixed signal is a signal which gives a command to retain the location of the electrode EL at the current position, or to prevent the descent of the electrode EL from exceeding a required set depth.

A mean voltage detector 60 is a detector which samples the gap voltages to detect a mean voltage. Alternatively, detector 60 may be arranged to detect mean gap current.

A comparator 61 compares a value of mean voltage from the detector 60 with a reference value from a reference value generator 62. The comparator 61 generates an output indicative that the water-removing operation is complete when the mean voltage became larger than the reference value.

The reference value generator 62 is a circuit which creates the reference value for the required voltage or current.

An addressing circuit 80 generates an address output corresponding to the working conditions which are suitable for the water removing operation to a machining condition storage circuit 81 whenever it receives a switching signal from the CPU 90 indicating a change of working fluid from water to oil. In addition, the addressing circuit 80 generates an address output signal to the machining condition storage circuit 81 for specifying the address corresponding to working conditions which are suitable for finish cutting using oil as a working fluid when receiving the signal from the comparator 61 indicative of the completion of the water removing operation.

In the working conditions storage circuit 81, two or more preset working conditions are stored, and the required working conditions, including those for removal of water, can be accessed by addressing such working conditions. The working conditions denote a combination of parameters such as the ON time of the machining pulses (Ton), the OFF time of the machining pulses (Toff), the impressed voltage (V), the peak value of current (Ip), the servo voltage (SV) and the like.

A spark pulse generating circuit 82 is a circuit for producing electrical-discharge machining pulses having the ON time of machining pulses, OFF time of machining pulses, the impressed voltage, peak value of current and the like having been set to the desired values according to the output signals from the working condition storage circuit 81. The spark pulse generating circuit may consist of a DC power supply having multiple voltage sources, a plurality of switching elements, a plurality of resistances and the like.

Figure 2:
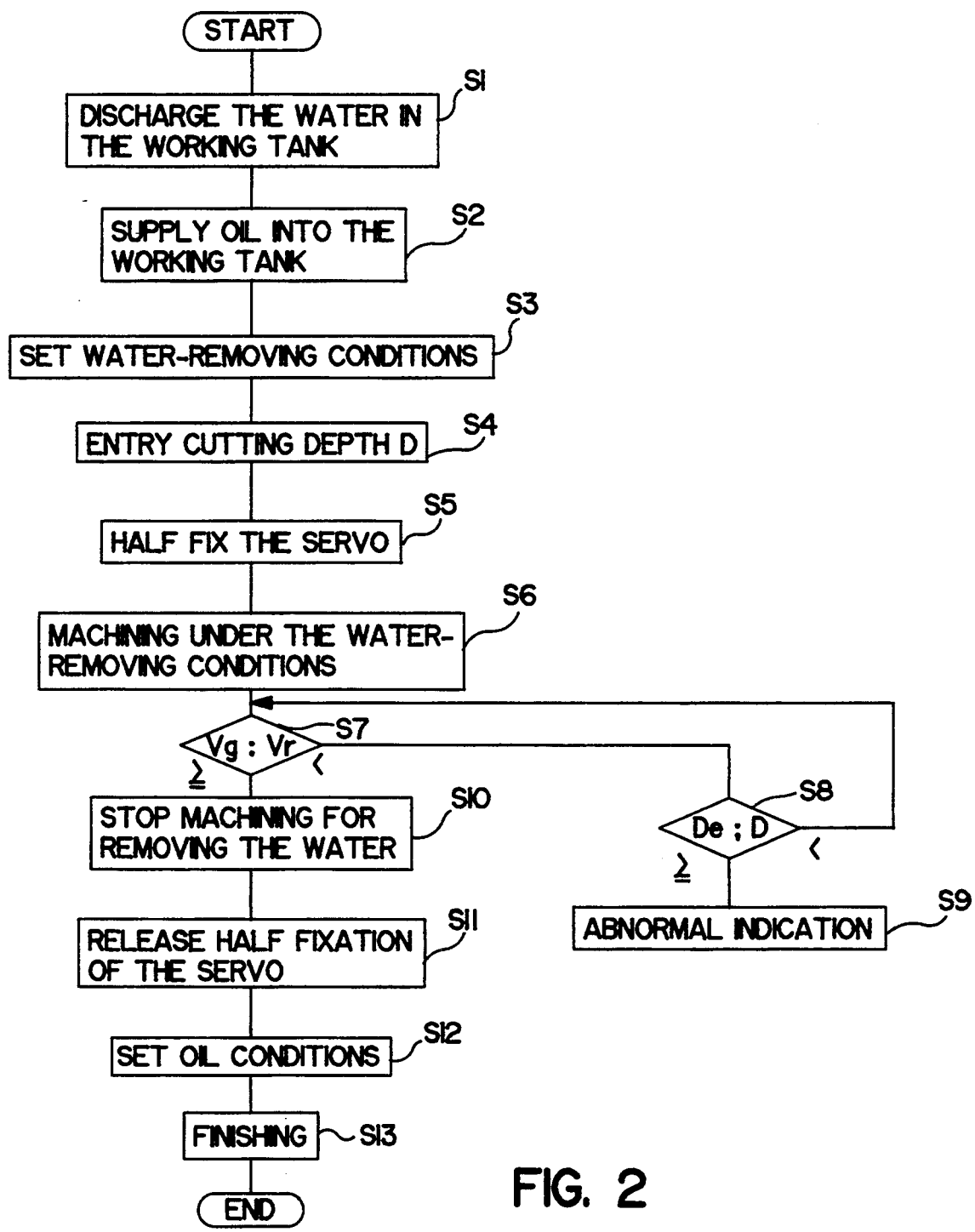
FIG. 2 is a flowchart representing the operation of the embodiment of FIG. 1.

The operation of the above embodiment will now be discussed. FIG. 2 is a flowchart representing the operation of the embodiment of FIG. 1. After rough machining using water as the working fluid is completed, the pump 31 is stopped and the water in the work tank T is discharged (step S1). In this case, the CPU 90 opens the solenoid valves 15 and 16 and holds the solenoid valve 17 closed. The water in the work tank is thus routed into the tank 20a. Before roughing is completed, the solenoid valve 16 is open and the solenoid valve 15 is closed, and water flows into the tank 20a through the overflow line 13.

Meanwhile the CPU 90 simultaneously generates an output in the form of a switching signal and activates the pumps 34 and 32 causing oil to be supplied to the work tank T (step S2). The addressing circuit 80, which received the switching signal, specifies the address corresponding to the working conditions for removing water from the working conditions storage circuit 81 (step S3), and sets a cutting depth D (step S4). The cutting depth D is set slightly less than the required end depth and is set to prevent excessive machining. Since finishing using oil is carried out after the water removing operation has been finished, the depth subtracted from the allowance for finishing is set as the cutting depth D. If the operator specifies a required cutting depth in the NC program in advance, the NC program has the capability of setting the cutting depth D.

Next, the movement of the servo is set to be a half fixation (step S5). That is, the location of the electrode EL is retained at the current position, or the electrode EL is commanded so as not to go down, i.e., into the workpiece, beyond the set value D in cutting depth. Then, electrical-discharge machining is carried out under the conditions for removing water (step S6). As the temperature of the water in the gap goes up with the discharged electric sparks, the water changes into bubbles, namely steam, and water becomes like fine particle due to the pressure created by the sparking. The resulting particle-like steam and water migrates away from the gap with the bubbles, and the water is thus removed. At this time, it may be also arranged so that by intermittently actuating the pump 32, an oil jet is used intermittently to promote the removal of water from the gap. In addition, since the movement of the servo is in a half-fixed condition, the electrode EL never descends beyond the set value D in cutting depth, thereby preventing over-cuts (machining beyond the desired cutting depth).

Next, a comparison between a mean voltage Vg across the gap and a value of reference voltage Vr is made (step S7), and if the mean voltage Vg is smaller than the reference voltage Vr, a comparison between the set cutting depth value D and a current cutting depth value De is made (step S8). If the value De is smaller than the set value D, steps S7 through S8 are repeated while machining under the working conditions for removing water is continued. In the event the value De is greater than the set value D, an abnormal machining indication is given.

On the other hand, if the mean voltage Vg exceeds the reference voltage Vr (step S7), the comparator 61 outputs a water removal completion signal, concluding that the water has been removed from the gap, the addressing circuit 80 stops the output of the address with respect to machining conditions for removing water. Machining for removing water is thus stopped (step S10). Meanwhile, finishing is carried out by releasing the half fixation of the servo (step S11) and setting working conditions for finishing using oil (step S12). It may be arranged so that the working conditions for finishing are set either by the operator or by reading preprogrammed conditions from the NC program.

In other words, the above embodiment includes a process of machining using a water based working fluid, a process for discharging the water and replacing it with oil in the machined recess, a process of removing the water remaining in the machined recess by electrical-discharge machining after the replacement process, and a process of machining using oil as the working fluid under the desired working conditions after the water removal process. The water removal process is a process which is terminated when the value of working voltage or current during electrical-discharge machining reaches or exceeds a predetermined value.

According to the above embodiment, when the process is shifted from electrical-discharge machining using water as the working fluid to that using oil, the water is almost completely removed from the gap between the electrode EL and the work W.

Figure 3:
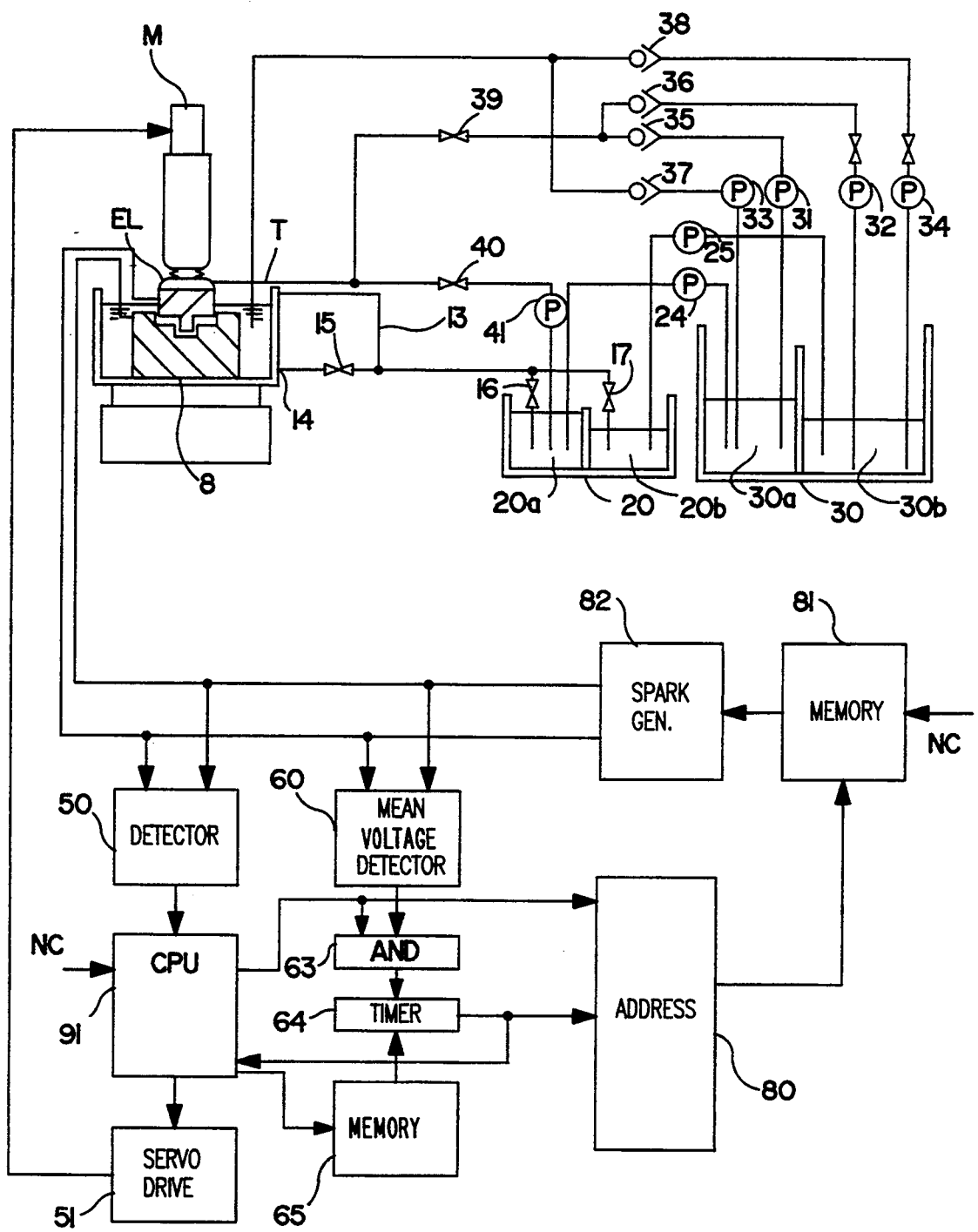
FIG. 3 is a schematic representation of another embodiment of the present invention.

FIG. 3 is a working schematic representation of another embodiment of the present invention. In this embodiment, similar devices are labelled with similar reference numerals as used in FIG. 1. Instead of the comparator 61 shown in FIG. 1, an AND circuit 63 and a timer 64 are used and instead of the reference value generator 62, a memory 65 is used. In this embodiment, it is concluded that water removal is completed when the timer set time has elapsed after staring electrical-discharge machining under working conditions for removing water.

The AND circuit 63 is a circuit which initiates counting of the timer set time when both the change-over signal from the CPU 91 and the discharge start detection signal from the mean voltage detector 60 are received. The memory 65 is a device which includes a table interrelating the cubic volume of the machined recess in the workpiece W to the timer set time required for removing water depending upon specific working currents. Information about the timer set time is input to the timer 64 according to the volume data of the workpiece W (data concerning the cubic volume of the machined recess in the workpiece W) received from the CPU 91. Also, it may be arranged so that the operator includes information about the timer set time based on a data list in the NC program. In this case, the timer set time information is transferred to the timer 64 through the CPU 91.

The timer 64 is an example of a means for counting the necessary machining time for water removal after the change-over from water to oil.

Figure 7A:
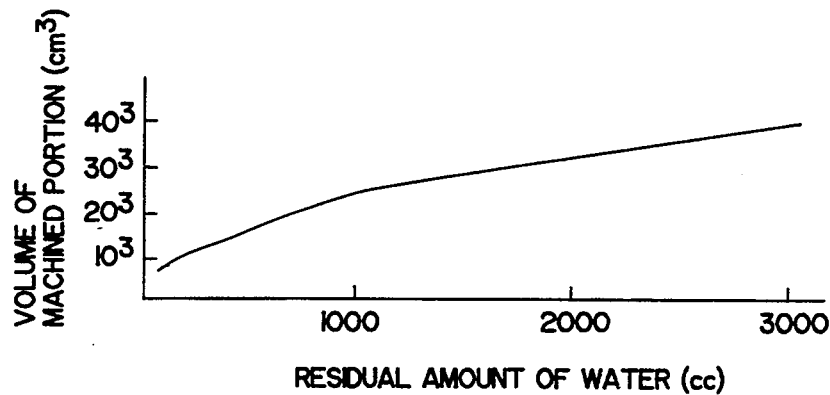
FIG. 7(A), 7(B), and 7(C) are a graphic illustrations representing the data shown in FIG. 6.
Figure 7B:
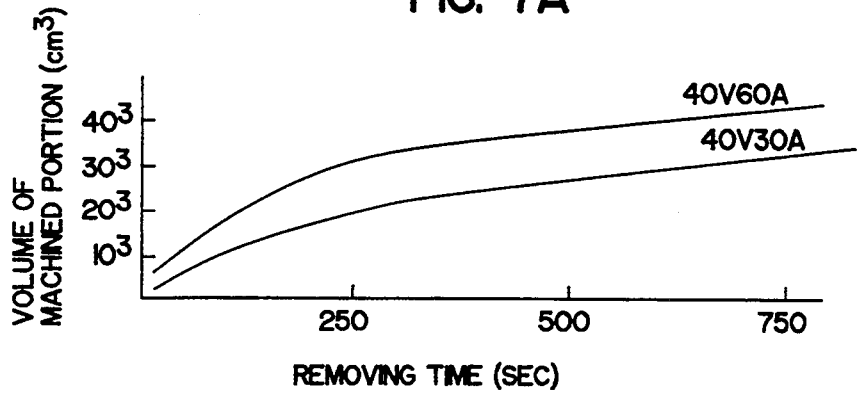
Figure 7C:
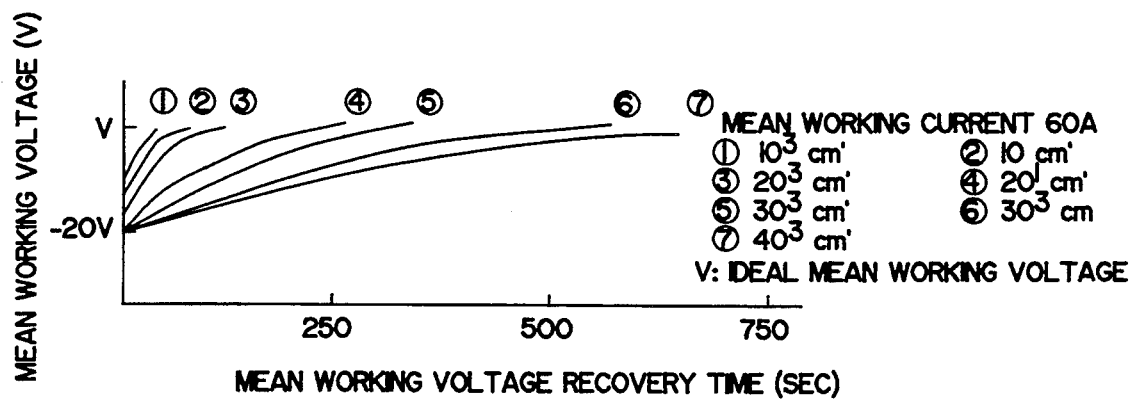

An example of a table for setting water removal time is shown in FIG. 5, wherein the timer set time lengthens as the volume of the machined recess increases. The data included in FIG. 5 is in accordance with the information shown in FIG. 6 wherein the values for volume of the machined recess, residual volume of water, time required for removing the water, recovery time for a mean working voltage, and consumed quantity of heat are actually measured values. FIG. 7 is a graphical illustration of the measured data. FIG. 7(1) shows the relationship between the residual volume of water in the machined recess and the volume of the machined recess; FIG. 7(2) depicts the relationship between the water removal time and the volume of the machined recess; and FIG. 7(3) depicts the relationship between the recovery time for the mean working voltage for various machined recess volumes.

Figure 4:
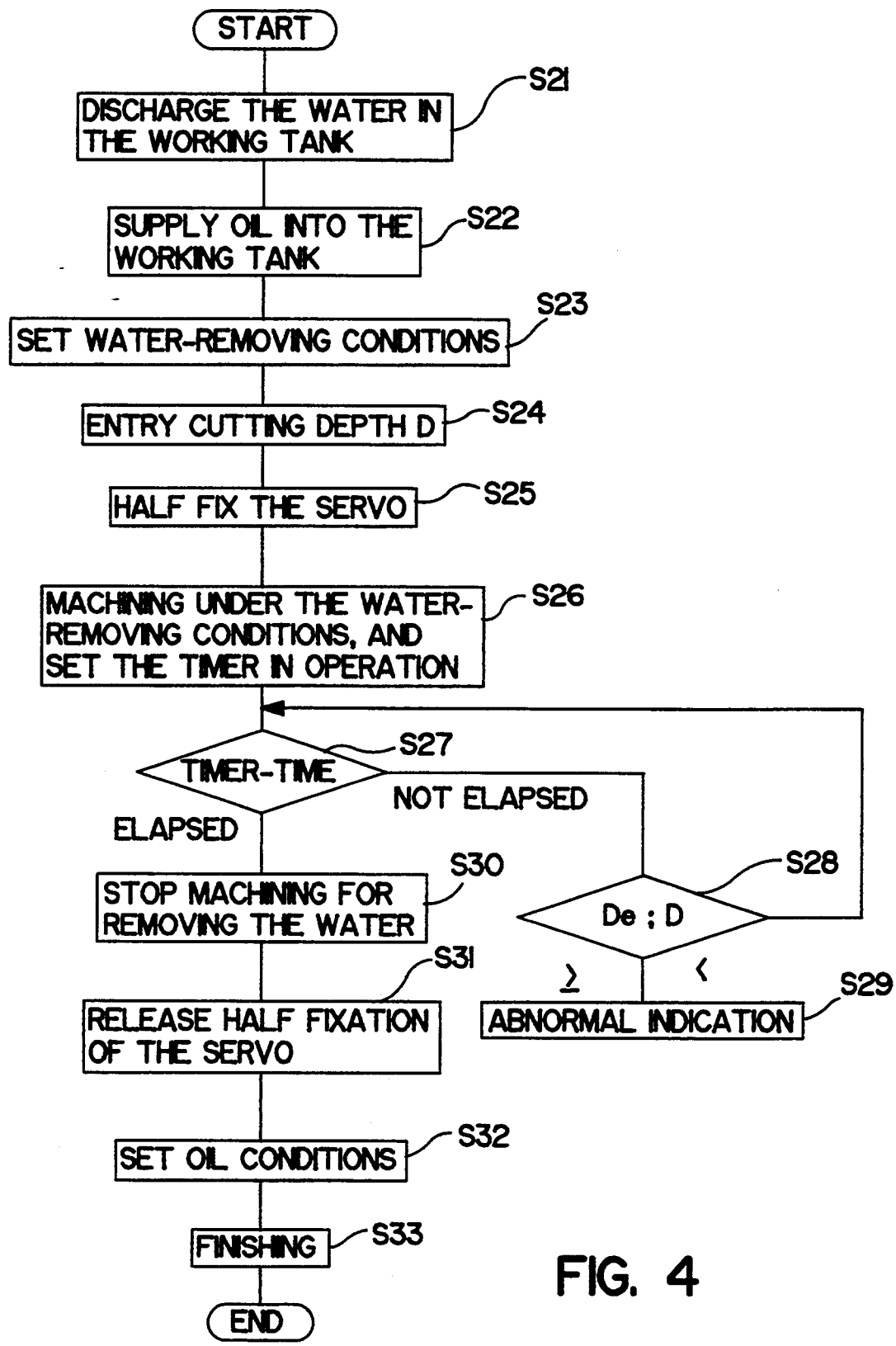
FIG. 4 is a flowchart representing operations of the embodiment shown in FIG. 3.

FIG. 4 is a flowchart representing an operation of the embodiment shown in FIG. 3.

In this flowchart, steps S21 through S25 are the same as steps S1 through S5 shown in FIG. 2. After the movement of the servo is half-fixed (step S25), machining is initiated under working conditions for water removal, and the timer 64 is set in operation. This set time is a time duration output by the memory 65 according to the volume data transferred from the CPU 91. During the timing out of the set time, an abnormal indication is output (at step S29) if the value De, representing the current cutting depth, becomes greater than the set cutting depth value D (step S28). If no abnormal indication is generated, the timer 64 will continue its timing out action (step S27) until set time elapses at which time it is assumed that the water has been removed from the gap. At that time, the address circuit 80 stops outputting the address signal from the address corresponding to water removal working conditions, and machining for water removal is stopped (step S30). Then finishing is carried out (step S33) after releasing the half fixation of the movement of the servo (step S31), and setting the working conditions for finish cutting using oil as the working fluid (step S32). In this embodiment, if a sufficient working allowance (cutting depth) is available, the half-fixed movement of the servo may not be required.

As stated above even if machining is carried out under water removal working conditions by reference to a set time corresponding to the volume of the machined recess instead of by detecting the mean voltage, when shifting from machining using water to that using oil, the water is almost completely removed from the gap between the electrode EL and the workpiece W.

The reference value generator 62 and the comparator 61 shown in FIG. 1 may be included in the embodiment shown in FIG. 3 as follows. The apparatus of FIG. 3 may be arranged so that a comparator such as the comparator 61 is included which compares the value of mean voltage Vg from the detector 60 with the value of reference voltage Vr from the reference value generator 62 after the set time of the timer 64 has elapsed, and, if at that time, the value Vg is larger than the value Vr, the signal indicative that water removal is complete is output to the address circuit 80. If so arranged, the reliability of the water removal operation will increase.

FIG. 8(1) is a schematic representation of another embodiment of the present invention, and FIG. 8(2) is a schematic representation of a discharge stand-by time $\tau W$.

In this embodiment, a $\tau W$ detector 70 is a circuit which detects an increasing rate of machining pulses excluding discharge stand-by time $\tau W$, with respect to the number of working voltage pulses impressed across the machining gap. The discharge stand-by time $\tau W$ is the amount of time until electric discharge sparking is initiated after application of a machining voltage pulse across the machining gap. A decision circuit 71 is a circuit for determining if the water has been removed from the gap when the increasing rate of occurrence of a standby time τW has reached a required value, and the set time of the timer 67 has elapsed. The timer 67 is the same as the timer 64 shown in FIG. 3. However, in FIG. 8(1), the detector 60 for detecting the mean gap voltage the AND circuit 63 are omitted and not indicated diagrammatically in FIG. 8(A).

Figure 8A:
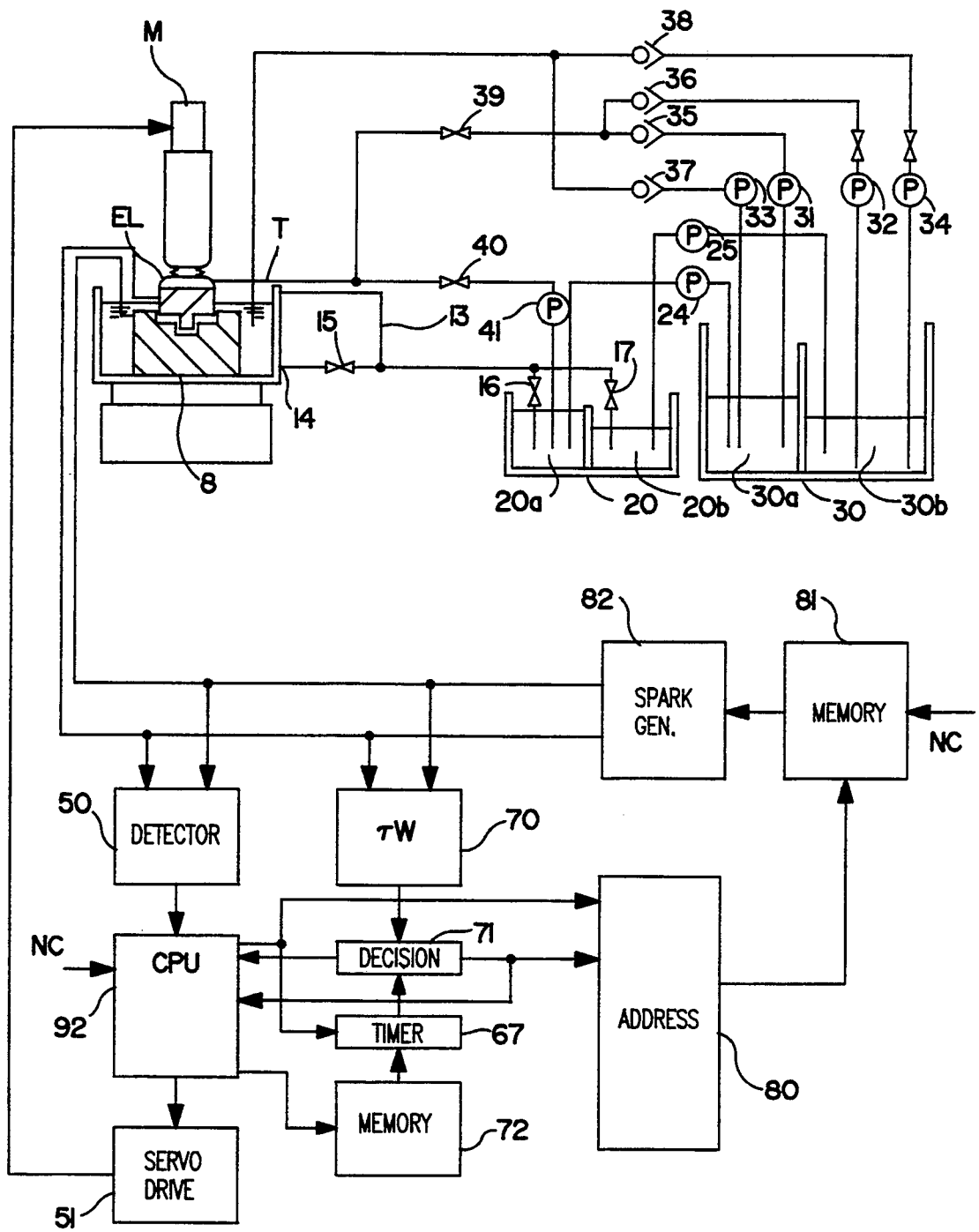
FIG. 8(A) is a schematic representation of another embodiment of the present invention.

In the embodiment shown in FIG. 8(A), once machining has started under working conditions for water removal after half fixing the movement of the servo the timer 67 is set in operation. The timer set time is a time that is output by the memory 72 according to the removal volume data from a CPU 92. Once the set time has elapsed, the decision circuit 71 detects the rate of increase in the occurrence of machining pulses which result in a discharge stand-by time τW and outputs a water removal complete signal to the address circuit 80 if the number of pulses which result in a discharge stand-by time τW reaches a required value, e.g., 90% or more. The address circuit 80, when receiving the water removal complete signal, stops the output of the address signal to the working conditions storage circuit 81 which corresponds to water removal machining conditions and releases the half fixation of the movement of the servo. Machining is then carried out under working conditions for finishing using oil. It may also be arranged wherein the number of pulses which result in a discharge stand-by time τW is other than an arbitrary value, i,e,, other than 90%, wherein the water removal complete signal is output.

Figure 8B:
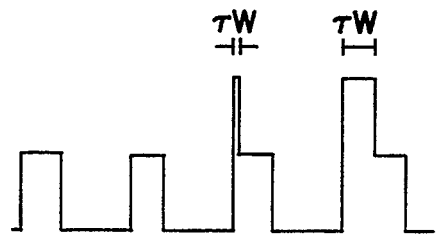
FIG. 8(B) is a graphical representation of possible machining pulses.

In the pulses shown in FIG. 8(B), the first and second gap voltage pulses show no discharge stand-by time τW, while, in the third and fourth, a discharge stand-by time τW is present. To detect the increasing occurrence of pulses giving rise to a discharge stand-by time, τW, it is assumed that a discharge stand-by time τW has occurred, even for those pulses having a short τW. Also, it may be arranged such that when the discharge stand-by time τW is of a required time length or more, the water removal completion signal is output.

To put this in more concrete terms, the τW detector 70 may include a threshold generator for producing a required threshold level and a comparator which outputs a signal indicative that discharge stand-by time τW has occurred when the value of voltage of the gap voltage pulse is larger than the threshold level. The decision circuit 71 may include a timer to measure a unit time, a counter to count the number of output signals from the τW detector 70, a register to output a signal equivalent to a 90% rate of discharge standby time signals, and a comparator to compare output values of said counter and register.

Figure 9:
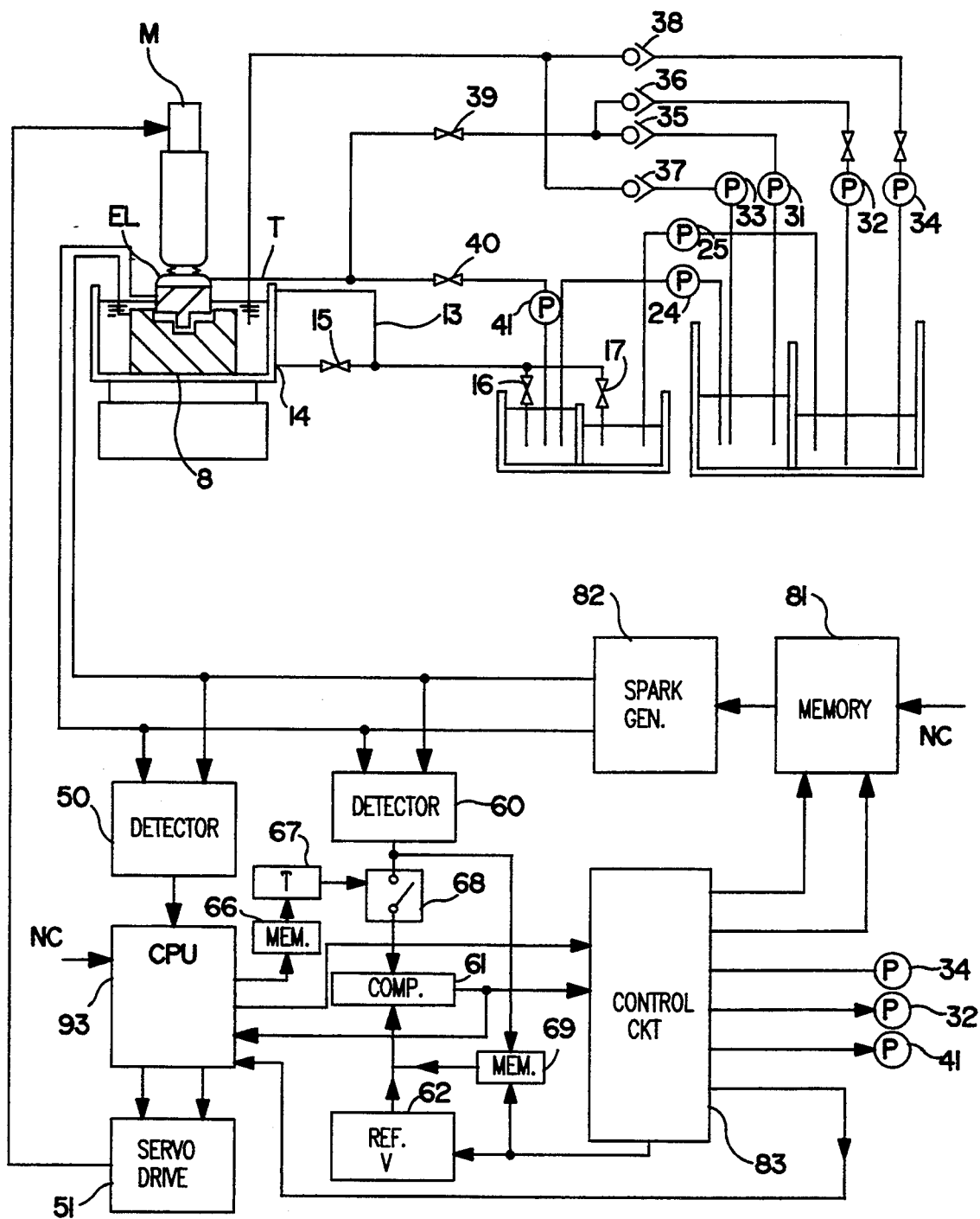
FIG. 9 is a schematic representation of still another embodiment of the present invention.

FIG. 9 is a schematic representation of still another embodiment of this invention. In this embodiment, a memory 66 generates an output of the required timer set time according to the volume data from a CPU 93, and until this set time elapses, the timer 67 holds a switch 68 open to block the mean voltage signal from the detector 60 to the comparator 61. When the set time has elapsed, the timer 67 closes the switch 68 thereby connecting the mean voltage from the detector 60 to the comparator 61. If the output of the comparator 61 is indicative that the mean voltage is smaller than the reference value, the control circuit may operate to, in sequence, change the reciprocating conditions of the electrode, change the jetting or flushing, commence suction of the water, boost the line voltage and/or increase the working current. For each step in the sequence (see FIG. 10), a comparison between the previous and present mean voltage is made. When the present mean voltage is larger than the previously detected mean voltage, the present mean voltage in that step of the sequence is compared with the reference value, and water removal machining is terminated if the present mean voltage is larger than the reference value. The reciprocating conditions are conditions of moving the electrode EL up and down with respect to the workpiece W in order to increase or decrease the gap between the electrode EL and the workpiece W, and the reciprocation conditions, e.g., a time interval between the first and second vertical movements and a time length for each vertical movement. These conditions are conditions which have been preset in a CPU 93 (NC unit), and also the execution of the reciprocating conditions may be initiated by a reciprocating operation command signal.

The switch 68 is formed between the detector 60 and the comparator 61, and is a switch which remains open until the timer 67 times out the timer set time.

A memory 69 is a memory to store successive output signals from the detector 60 responsive to a control signal from a control circuit 83. The control signal from the circuit 83 is a signal indicative of which signal is to be used for purposes of making a comparison using the comparator 61. The memory 69 stores values corresponding to the sequence indicated by the control signal, and generates an output. For the first comparison, the mean voltage, $Vg1$, is compared with the reference value, $Vr$, from the reference value generator 62. Since the mean voltage in the initial condition, $Vg1$, is stored to be used for the next comparison, suppose the control signal from the control circuit 83 is "1" the memory 69 stores the mean voltage $Vg1$ at this time, and the reference value generator 62 produces the reference value $Vr$. When the control circuit 83 generates a "2" as a control signal, the memory 69 stores a mean voltage $Vg2$ and generates an output on the basis of a comparison with the mean voltage $Vg1$ in the comparator 61.

When the control circuit 83 generates a "3" as the control signal, the memory 69 stores a mean voltage $Vg3$ and generates an output on the basis of a comparison with the mean voltage $Vg2$ in the comparator 61. When a "4" is generated as the control signal, the memory stores mean voltage $Vg4$ and generates an output on the basis of a comparison with the mean voltage $Vg3$ in the comparator 61. When a "5" is generated as the control signal, the memory 69 stores a mean voltage $Vg5$ and an output is generated on the basis of a comparison with the mean voltage $Vg4$ in the comparator 61. When a "6" is generated as the control signal, the memory 69 stores a mean voltage $Vg6$ and an output is generated on the basis of a comparison with the mean voltage $Vg5$ in the comparator 61. When a "7" is generated as the control signal, the memory 69 stores a mean voltage $Vg6$ and outputs the mean voltage $Vg6$ to the comparator 61.

The operation of the above embodiment is discussed below.

Figure 10:
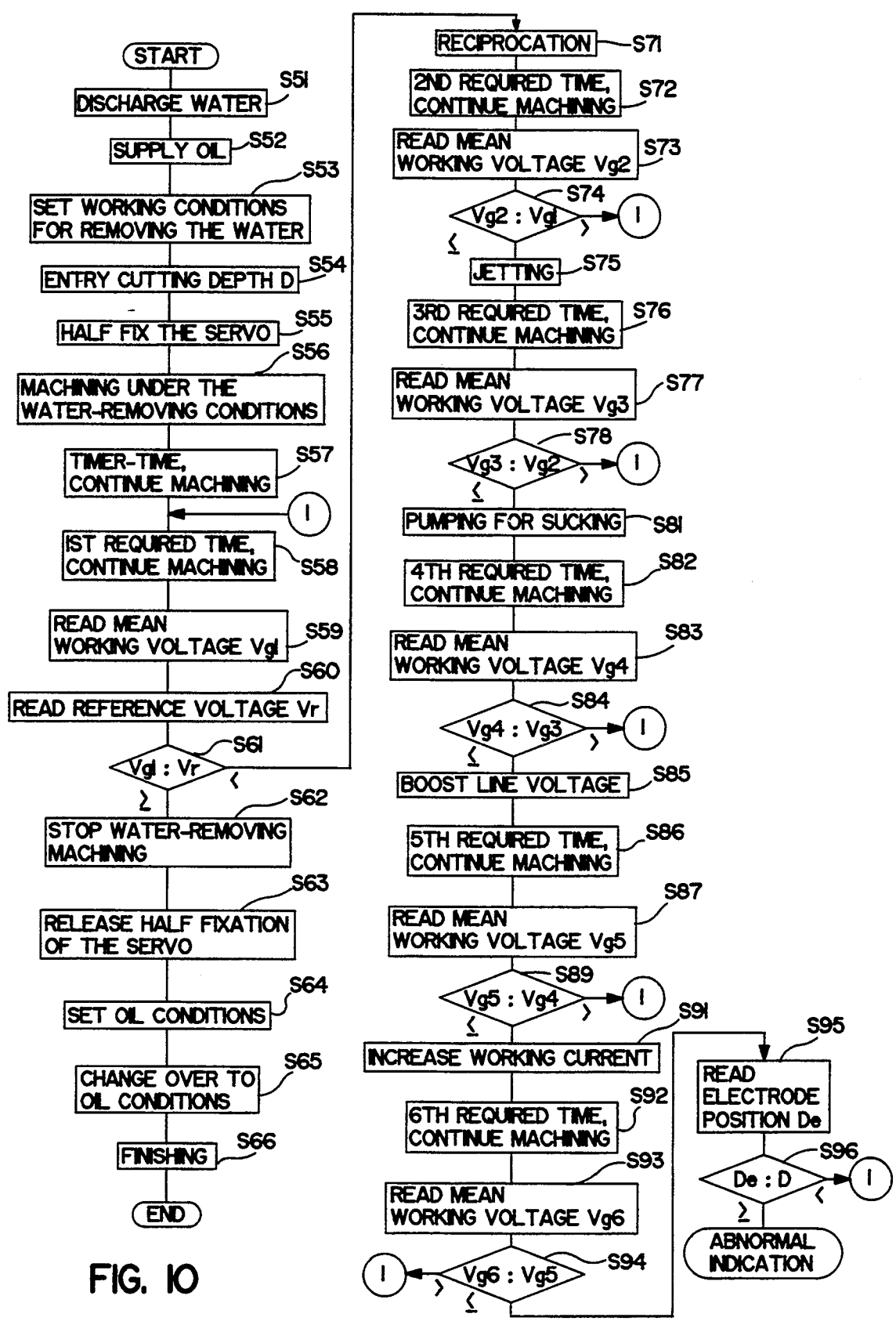
FIG. 10 is a flowchart representing the operation of the embodiment shown in FIG. 9.
Figure 11A:
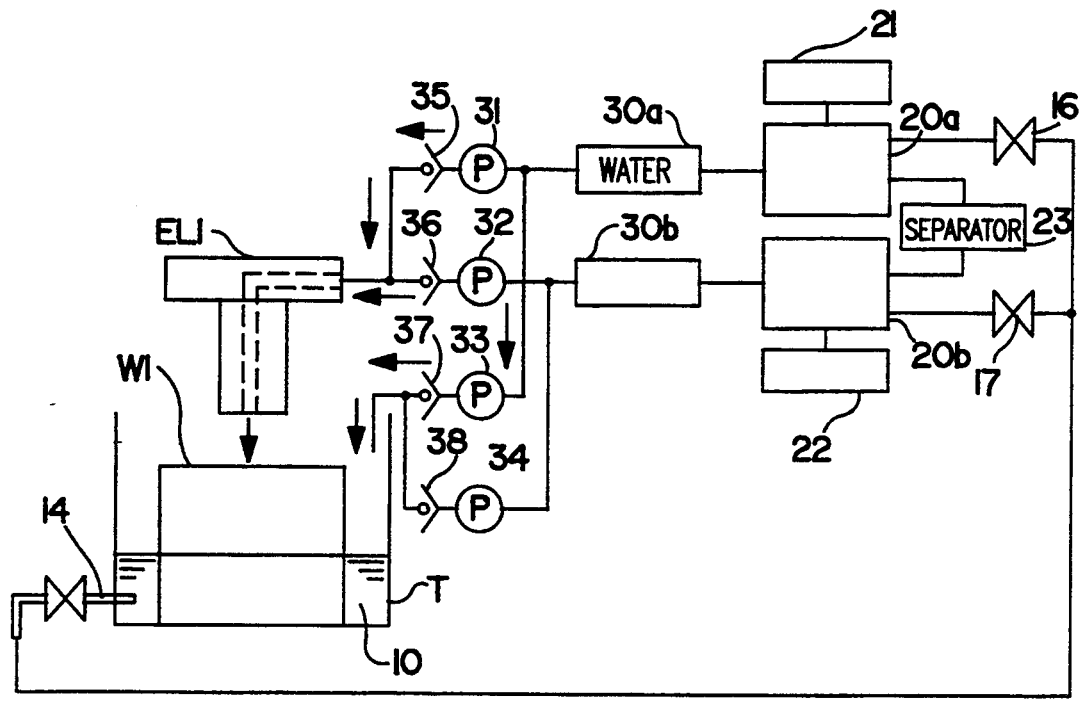
FIG. 11(A), 11(B), 11(C) and 11(D) are a schematic representations of the background art.
Figure 11B:
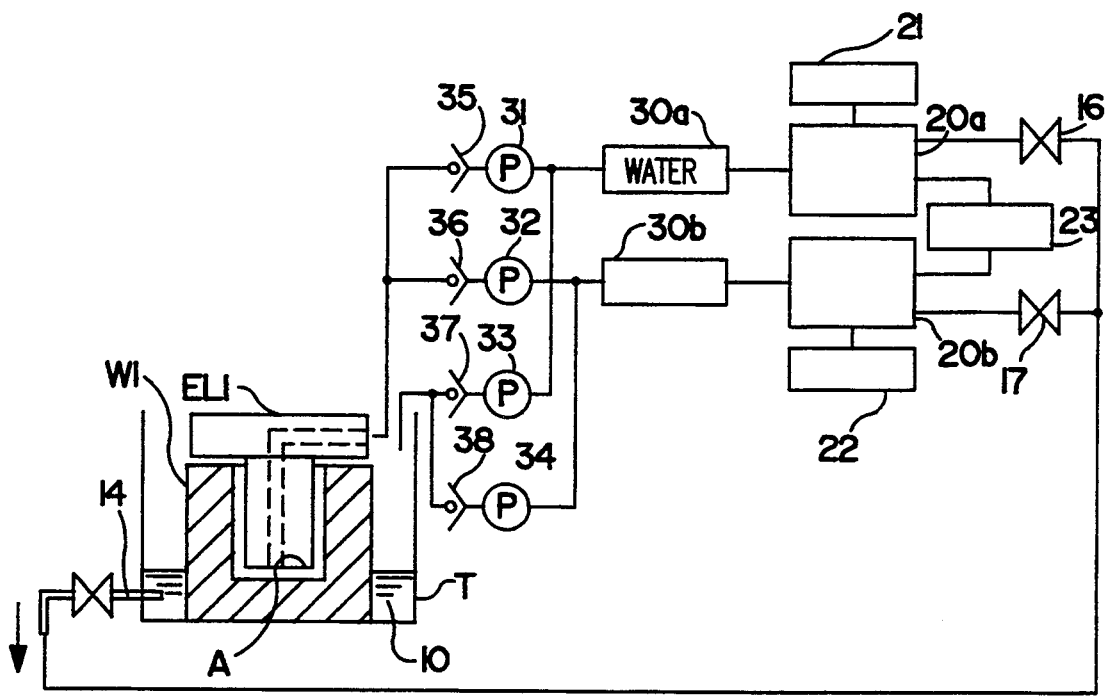
Figure 11C:
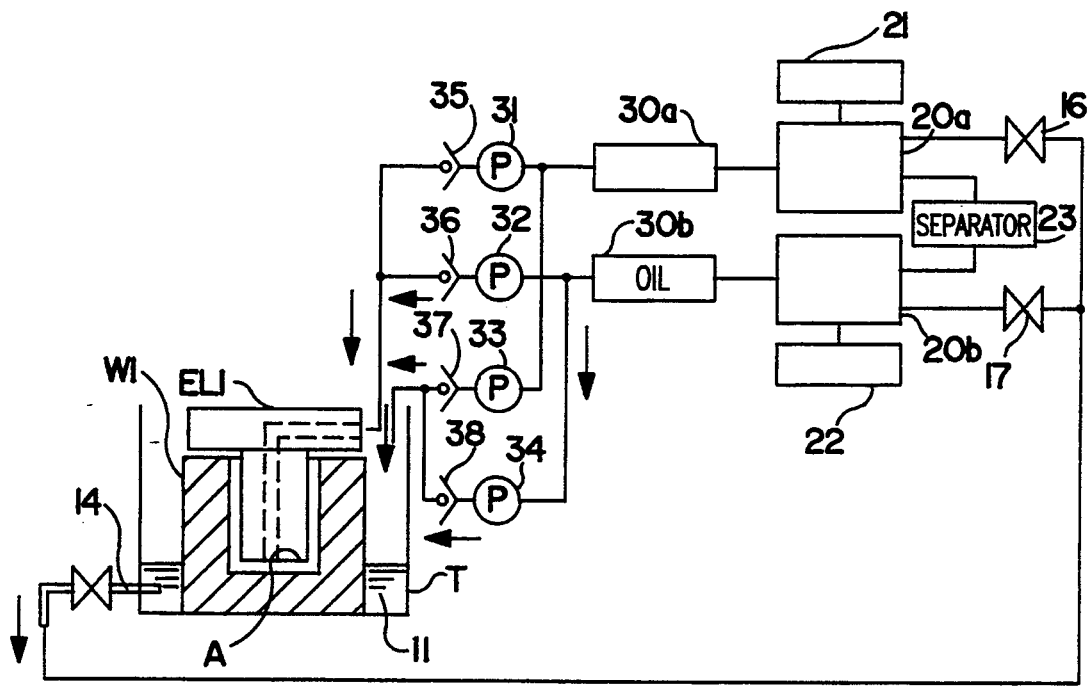
Figure 11D:
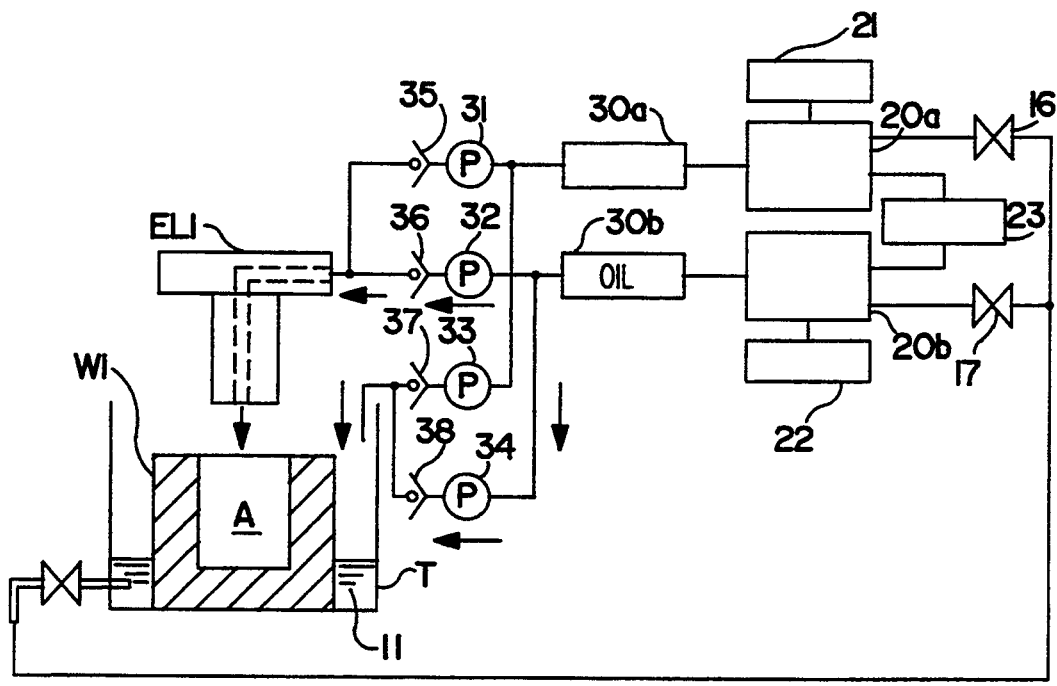
Figure 12A:
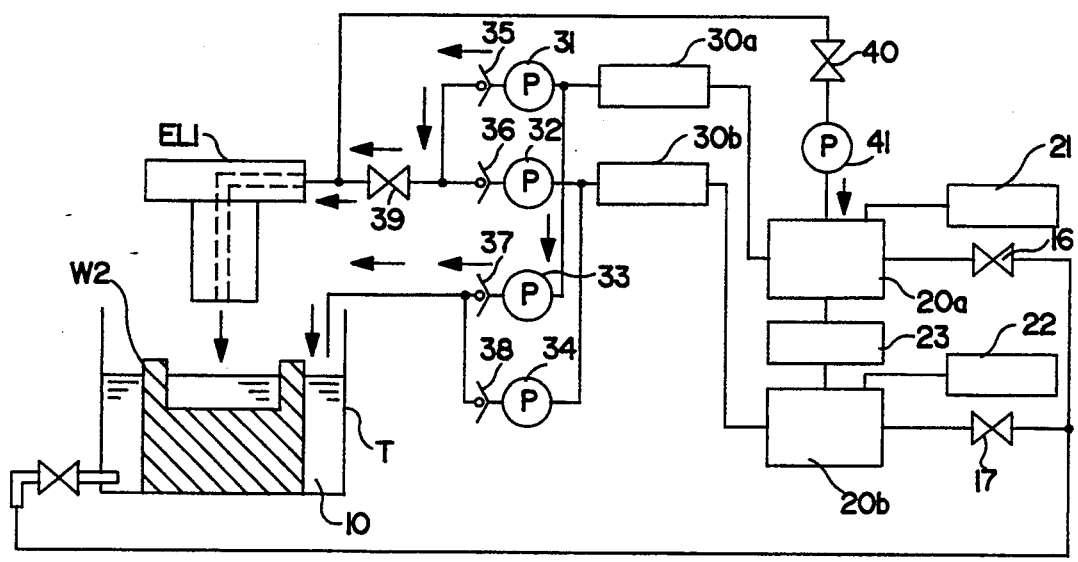
FIG. 12(A), 12(B), 12(C) and 12(D) are a schematic representation of a different background art.
Figure 12B:
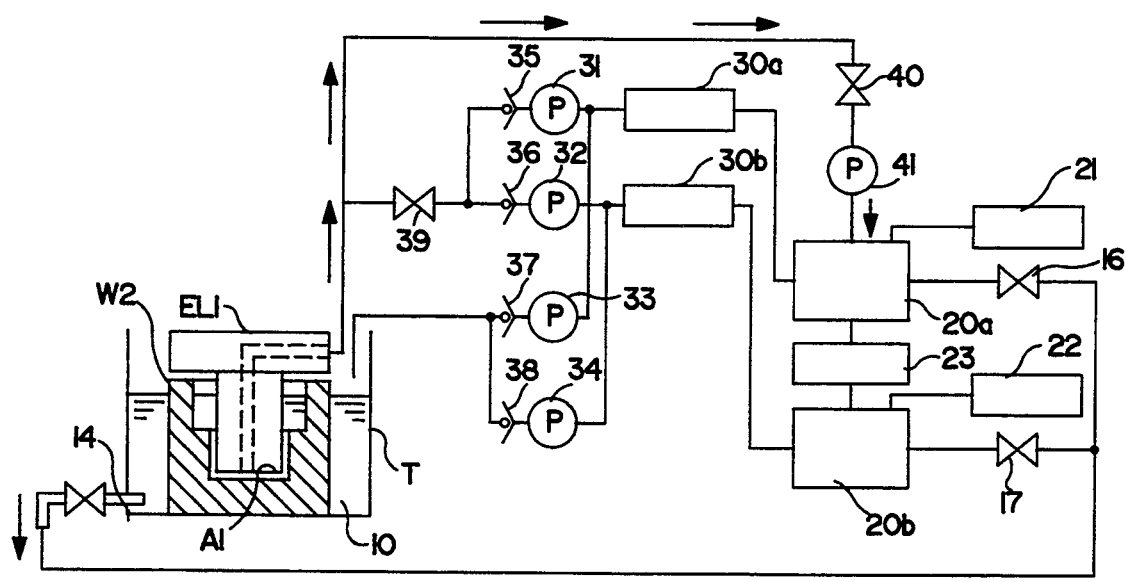
Figure 12C:
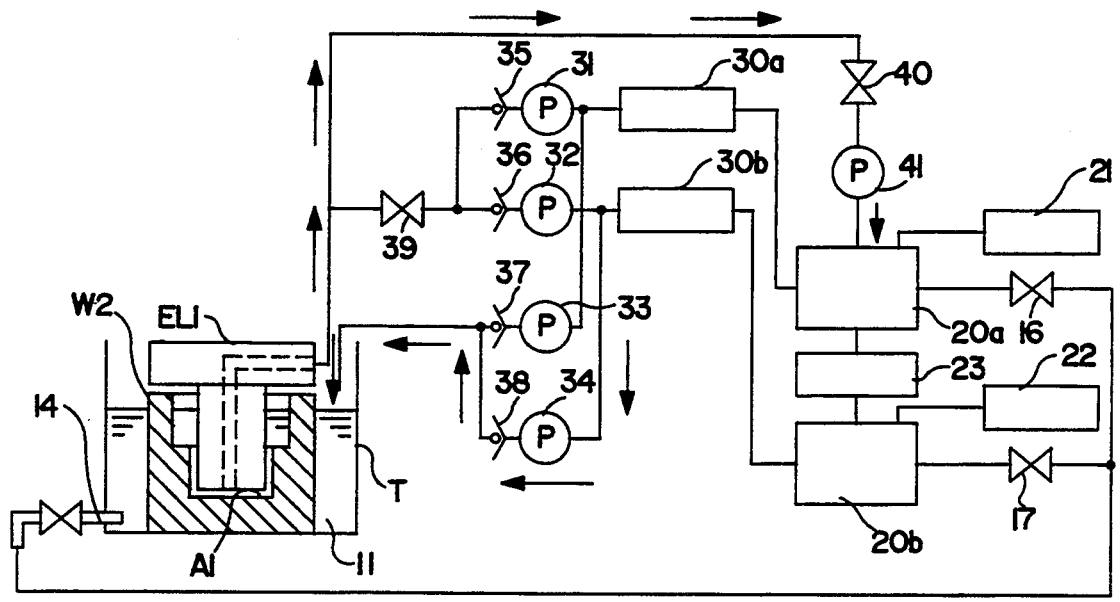
Figure 12D:
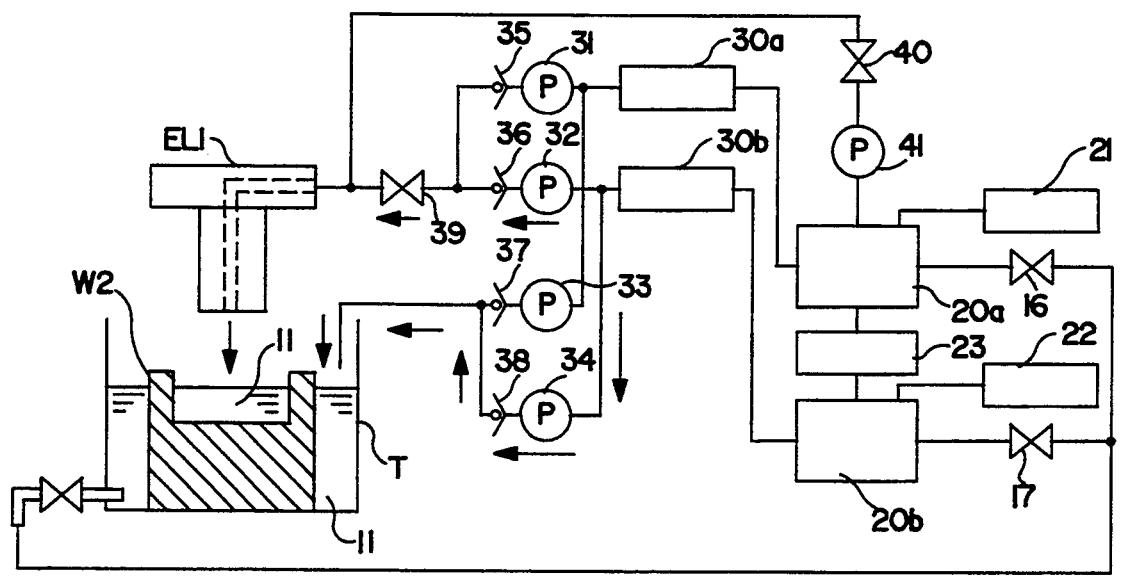
Figure 13A:
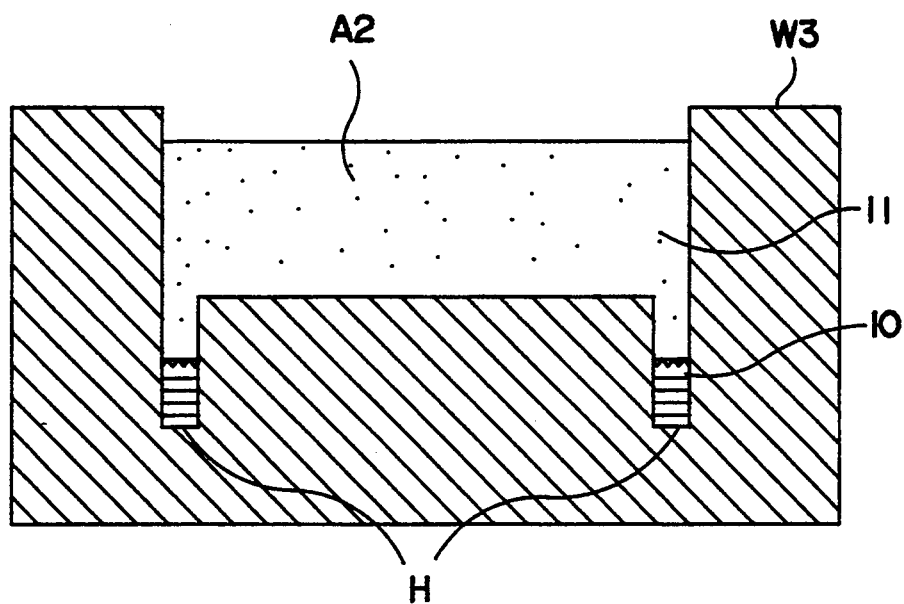
FIG. 13(A) is a schematic representation of a small groove formed in the machined recess in the workpiece.
Figure 13B:
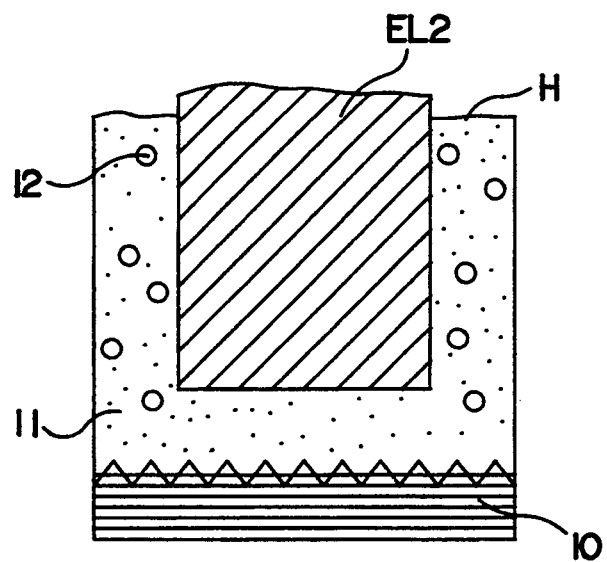
FIG. 13(B) illustrates a detail of the groove of FIG. 13(A), with the electrode therein.

FIG. 10 is a flowchart representing the operation of the embodiment shown in FIG. 9.

In this flowchart, steps S51 through S56 are same as S1 through S6 shown in FIG. 2. After machining under water removal conditions is carried out during the set time of the timer 67 (step S57), machining is continued beyond the first required time for a few milliseconds to over ten milliseconds (step S58). Then the mean voltage Vg1 is stored in the memory 69 and simultaneously sent to the comparator 61 through the switch 68 (step S59). The reference voltage Vr from the reference voltage generator 61 is also output to the comparator 61 (step S60) and the mean voltage Vg1 and the reference voltage Vr (step S61) are compared. If the mean voltage Vg1 is larger than the reference voltage Vr, it is concluded that the water has been removed and the CPU 93 (NC unit) stops machining for removing water (step S62). In addition, the CPU 93 sets the machining conditions for machining using oil (step S64), and releases the half fixation of the movement of the servo (step S63). Then, finishing is carried out, shifting to working conditions for finish machining (steps S65, S66).

However, at step S61, the control circuit 83 outputs a reciprocation command if the mean voltage Vg1 is less than the reference voltage Vr, and the servo drive 51 controls the reciprocating operation through the CPU 93 (step S71). In other words, the apparatus is controlled so that by vertically moving the electrode EL with respect to the workpiece W to increase or decrease the gap, the water therein is removed. In step S71, it may be arranged, as discussed above, that the reciprocating conditions are modified before carrying out the reciprocating operations instead of simply doing so. Thereafter machining is continued while carrying out the reciprocating operations by a second required time for about a few seconds to over ten seconds (step S72), during which the mean voltage Vg2 existing after the passage of said second required time (step S73) is detected and compared with the mean voltage Vg1 (step S74). It is concluded that the removal of the water in the gap has progressed if the mean voltage Vg2 is larger than Vg1, i.e., the present mean voltage is larger than the previous one (step S74). Thereupon, the process returns to step S58.

However, if the mean voltage Vg2 is smaller than the voltage Vg1, it is concluded that further, powerful water removing-operation in the gap is required and oil from the jet nozzle formed in the electrode is forced into the gap by actuating the pump 32 (step S75), and continuing to machine while "jetting" oil under pressure for a third required time, in the range of from about a few seconds to over ten seconds (step S76). After the required time has elapsed, the mean voltage Vg3 is detected (step S77), and a comparison is made between the mean voltages Vg2 and Vg3 (step S58). If the mean voltage Vg3 is larger than Vg2, it is concluded that the removal of the water in the gap has progressed, and the process returns to step S58.

If the mean voltage Vg3 is smaller than Vg2, it is concluded that further powerful water removal operation in the gap is necessary and suction of the water in the gap is started by actuating the pump 41 (step S81), and continuing machining while carrying out said suction operation for a fourth required time, in the range of from about a few seconds to over ten seconds (step S82). After the fourth required time has elapsed, the mean voltage Vg4 is detected (step S83), and a comparison is made between the mean voltages Vg3 and Vg4 (step S84). If the mean voltage Vg4 is larger than Vg3, it is concluded that water removal from the gap has progressed and the process returns to step S58.

However, if the mean voltage Vg4 is smaller than Vg3, it is concluded that to further powerful water removal operations in the gap are necessary and the line voltage is boosted (step S85) while continuing to machine for a fifth required time, of from about a few seconds to over ten seconds (step S86). After the fifth required time has elapsed, mean voltage Vg5 is detected (step S87) and a comparison is made between the mean voltages Vg4 and Vg5 (step S88). If the mean voltage Vg5 is larger than Vg4, it is concluded that the water removal in the gap has progressed, and the process returns to step S58.

If the mean voltage Vg5 is smaller than Vg4, it is concluded that further powerful water removal operations in the gap are required and the working current is increased (step S91) and machining continued for a sixth required time of from about a few seconds to over ten seconds (step S92). After passage of the sixth required time, the mean voltage Vg6 is detected (step S93) and a comparison is made between the mean voltages Vg5 and Vg6 (step S94). Then, if the mean voltage Vg6 is larger than Vg5, it is concluded that water removal in the gap has progressed, and the process returns to step S58.

However, if the mean voltage Vg6 is smaller than Vg5, it is concluded that further powerful water removal operations in the gap are required and the value De of the current cutting depth is determined (step S95), and an abnormal indication is given if the value De is greater than the set cutting depth value D (step S96). If the value De is smaller than the set cutting depth value D, the process returns to step S58. If the required value has been prespecified in the NC program, naturally this operation is not required.

As stated above, when the mean voltage is smaller than the reference voltage, it is possible to invoke powerful water removal measures by carrying out the reciprocating operation, jetting oil into the gap, suctioning water from the gap, boosting the line voltage, and increasing the working current. In most cases, there is no need to carry out all of the above measures, and the execution of one or more of them will usually suffice. With respect to the order of these conditions, an arbitrary order other than that described above will also suffice. However, introducing different electric conditions such as boosting the line voltage and increasing the working current, will cause electrical-discharge machining to advance the material removal of the workpiece W. As an excessive advance of the electrode in terms of material removal may cause inconvenience later on during finishing, it is therefore desirable to carry out such measures after the other described measures.

According to this invention, advantages are provided in that when changing the working fluid over from water to oil, the water in the machined recess in the workpiece can be almost perfectly and easily removed.

I claim:

1. A method of die sinking electrical-discharging machining a workpiece using water and oil based working fluids and a tool electrode, comprising:
    machining the workpiece using a water based working fluid;
    discharging the water based working fluid from a machined portion formed between the tool electrode and the workpiece and replacing said water based working fluid in said machined portion with an oil based working fluid;
    removing any residual water based working fluid remaining in the machined portion by electrical-discharge machining after said step of replacing; and electrical-discharge machining under working conditions for oil based working fluids using the oil based working fluid after said step of removing.

2. The method as set forth in claim 1, further comprising the steps of:
   detecting an electrical characteristic of a machining gap formed between said workpiece and said tool electrode; and
   ending the removing process for said water based working fluid when a value of said electrical characteristic reaches or exceeds a predetermined value.

3. The method as set forth in claim 1, further comprising the steps of:
   detecting the time duration of electrically-discharge machining during said step of removing; and
   ending the removing process for said water based working fluid when said electrical-discharge machining has been carried out for a predetermined time duration.

4. The method according to claim 1, further comprising the step of limiting the advance of said tool electrode into said workpiece during said step of removing.

5. The method according to claim 1, wherein said step of removing further comprises setting water removal machining conditions for said electrical-discharge machining.

6. The method according to claim 2, wherein said electrical characteristic is machining gap current.

7. The method according to claim 2, wherein said electrical characteristic is machining gap voltage.

8. The method according to claim 2, further comprising the steps of:
   setting a time duration for electrical-discharge machining during said step of removing;
   detecting, at the end of said time duration, an electrical characteristic of said machining gap;
   proceeding to said step of ending or to a further water removal step in response to the value of said detected electrical characteristic.

9. The method according to claim 8, wherein said further water removal step comprises reciprocating said tool electrode relative to said workpiece.

10. The method according to claim 8, wherein said further water removal step comprises injecting oil based machining fluid into said machined portion.

11. The method according to claim 8, wherein said further water removal step comprises suctioning water from said machined portion.

12. The method according to claim 8, wherein said further water removal step comprises modifying electrical-discharge machining working conditions used during said step of removing.

13. The method according to claim 12, wherein said step of modifying comprises increasing machining pulse voltage.

14. The method according to claim 12, wherein said step of modifying comprises increasing machining current.

15. A die-sinking electrical-discharge machining apparatus for machining by intermittently applying working pulses across a working gap formed between a workpiece and an electrode through a water or oil based working fluid, which comprises a working condition storage means for storing a plurality of working conditions including water removal working conditions;
   a detecting circuit for detecting an electrical characteristic of said working gap;
   a comparison circuit for comparing an output of said detecting circuit with a predetermined reference value and for outputting a signal indicative of the state of removal of said water based working fluid and for selecting working conditions from said storage means in accordance with the state of the water removal signal from said comparison circuit.

16. The apparatus according to claim 15, further comprising means for directing an advance of said electrode into said workpiece when machining under water-removal working conditions.

17. The apparatus according to claim 15, further comprising an addressing means, responsive to the output of said comparison circuit, for selecting a set of working conditions from said working condition storage means.

18. A die-sinking electrical-discharge machining apparatus for machining by intermittently applying working pulses across a working gap formed between a workpiece and an electrode through a water or oil based working fluid, which comprises a working condition storage means for storing a plurality of working conditions including water removal working conditions and addresses for said working conditions, an addressing circuit for generating an output for addressing said water-removing working conditions stored in said working condition storage means upon changing from a water based working fluid to an oil based working fluid, and timer means for timing the duration of applying said working pulses under water-removal working conditions after changing from said water based working fluid to the oil based working fluid to thereby machine under water-removal machining conditions.

19. The apparatus according to claim 18, further comprising means for directing an advance of said electrode into said workpiece when machining under water-removal working conditions.

20. The apparatus according to claim 18, further comprising detecting means for detecting a discharge stand-by time ($\tau W$) and means responsive to the timing act of said timer means and to said detecting means for generating a signal for addressing oil based working fluid machining conditions from said storage means.

* * * * *